United States Patent
Kim et al.

(10) Patent No.: US 10,026,956 B2
(45) Date of Patent: Jul. 17, 2018

(54) ANODE INCLUDING SPHERICAL NATURAL GRAPHITE AND LITHIUM SECONDARY BATTERY INCLUDING THE ANODE

(71) Applicant: LG Chem, Ltd., Seoul (KR)

(72) Inventors: Hyun Wook Kim, Daejeon (KR); Sang Wook Woo, Daejeon (KR); Je Young Kim, Daejeon (KR); Ki Tae Kim, Daejeon (KR)

(73) Assignee: LG Chem, Ltd. (KR)

( * ) Notice: Subject to any disclaimer, the term of this patent is extended or adjusted under 35 U.S.C. 154(b) by 865 days.

(21) Appl. No.: 14/257,094

(22) Filed: Apr. 21, 2014

(65) Prior Publication Data

US 2014/0227588 A1    Aug. 14, 2014

Related U.S. Application Data

(63) Continuation of application No. PCT/KR2014/000906, filed on Feb. 3, 2014.

(30) Foreign Application Priority Data

Feb. 4, 2013 (KR) .................... 10-2013-0012465

(51) Int. Cl.
*H01M 4/36* (2006.01)
*H01M 4/583* (2010.01)
(Continued)

(52) U.S. Cl.
CPC .......... *H01M 4/366* (2013.01); *H01M 4/587* (2013.01); *H01M 4/625* (2013.01); *H01M 4/62* (2013.01);
(Continued)

(58) Field of Classification Search
CPC .. H01M 10/0525; H01M 4/366; H01M 4/625; H01M 4/587; H01M 4/62; H01M 4/622
See application file for complete search history.

(56) References Cited

U.S. PATENT DOCUMENTS 6,040,092 A * 3/2000 Yamada ............... H01M 4/362
429/231.8
7,781,103 B2   8/2010 Sheem et al.
(Continued)

FOREIGN PATENT DOCUMENTS

| CN | 1848489 A | 10/2006 |
|---|---|---|
| EP | 1775785 A1 | 4/2007 |

(Continued)

OTHER PUBLICATIONS

European Search Report from Application No. 14726065.7 dated Dec. 18, 2014.
(Continued)

*Primary Examiner* — Ula C Ruddock
*Assistant Examiner* — Matthew W Van Oudenaren
(74) *Attorney, Agent, or Firm* — Lerner, David, Littenberg, Krumholz & Mentlik, LLP

(57) ABSTRACT

Provided are an anode including spherical natural graphite having a surface coated with an amorphous carbon layer, wherein a crystal orientation ratio is in a range of 0.06 to 0.08 at a compressed density of 1.40 g/cc to 1.85 g/cc, and a lithium secondary battery including the anode. Initial efficiency, electrode adhesion, and capacity characteristics of the lithium secondary battery may be improved by using the anode of the present invention in the lithium secondary battery.

13 Claims, 2 Drawing Sheets

HARD NATURAL GRAPHITE a

SOFT NATURAL GRAPHITE b

(51) Int. Cl.
*H01M 4/60* (2006.01)
*H01M 4/587* (2010.01)
*H01M 4/62* (2006.01)
*H01M 10/0525* (2010.01)

(52) U.S. Cl.
CPC ........ *H01M 4/622* (2013.01); *H01M 10/0525* (2013.01)

(56) References Cited

U.S. PATENT DOCUMENTS

| | | | | |
|---|---|---|---|---|
| 2004/0229041 | A1* | 11/2004 | Zou | C01B 31/04 428/408 |
| 2008/0274406 | A1* | 11/2008 | Fuse | C01B 31/04 429/231.4 |
| 2011/0059371 | A1* | 3/2011 | Kamada | H01M 4/587 429/332 |
| 2012/0231337 | A1* | 9/2012 | Miyata | C08J 3/05 429/217 |

FOREIGN PATENT DOCUMENTS

| | | | |
|---|---|---|---|
| EP | 1906472 | * | 4/2008 |
| EP | 1906472 | A1 | 4/2008 |
| JP | 2012033375 | A | 2/2012 |
| JP | 2012-216545 | A | 11/2012 |
| JP | 2013-211254 | A | 10/2013 |
| KR | 20020042586 | A | 6/2002 |
| KR | 20050100505 | A | 10/2005 |
| KR | 100578868 | B1 | 5/2006 |
| WO | 2011084817 | A1 | 7/2011 |

OTHER PUBLICATIONS

International Search Report from PCT/KR2014/000906 dated May 12, 2014.

* cited by examiner

ANODE INCLUDING SPHERICAL NATURAL GRAPHITE AND LITHIUM SECONDARY BATTERY INCLUDING THE ANODE

CROSS-REFERENCE TO RELATED APPLICATIONS

The present application is a continuation of International Application No. PCT/KR2014/000906 filed on Feb. 3, 2014, which claims the benefit of Korean Patent Application No. 10-2013-0012465, filed on Feb. 4, 2013, the disclosures of which are incorporated herein by reference.

TECHNICAL FIELD

The present invention relates to an anode including spherical natural graphite and a lithium secondary battery including the anode.

BACKGROUND ART

Recently, in line with miniaturization, lightweight, thin profile, and portable trends in electronic devices according to the development of information and telecommunications industry, the need for high energy density batteries used as power sources of such electronic devices has increased. Currently, research into lithium secondary batteries, as batteries that may best satisfy the above need, has actively conducted.

Currently, a carbon material is being used as an anode active material for a lithium secondary battery, and in particular, graphite having high crystallinity has mainly been used. Graphite has a layered structure, and lithium ions are intercalated between graphite layers from edges of the graphite layers during charge to form a graphite intercalation compound.

However, since most graphite has a flake-like morphology, a layer surface is deposited parallel to the surface of a current collector during the formation of an anode. Accordingly, the edges of the graphite layers are disposed perpendicular to a cathode, and thus, the lithium ions deintercalated from the cathode during the charge may not be smoothly intercalated between the graphite layers.

In particular, since the diffusion of lithium ions into graphite may not be sufficiently performed during high current charge, discharge capacity may decrease.

Also, since the lithium secondary battery generally uses a constant current-constant voltage charge method for charging and a constant current discharge method for discharging, lithium ions intercalated into the deep in graphite crystals at a low current during constant voltage charge may remain in the graphite without being completely discharged during high-rate discharge. Thus, it may be a cause of leading to cycle deterioration of graphite.

In particular, in a typical lithium secondary battery, since the lithium ions deintercalated from the cathode during the charge may not be smoothly intercalated between the graphite layers as described above, more lithium ions may remain in the graphite and the deterioration of cycle characteristics may increase.

DISCLOSURE OF THE INVENTION

Technical Problem

The present invention provides an anode for a lithium secondary battery having excellent initial efficiency, electrode adhesion, and capacity characteristics, and a lithium secondary battery including the anode.

Technical Solution

According to an aspect of the present invention, there is provided an anode including spherical natural graphite having a surface coated with an amorphous carbon layer, wherein a crystal orientation ratio is in a range of 0.06 to 0.08 at a compressed density of 1.40 g/cc to 1.85 g/cc.

According to another aspect of the present invention, there is provided a lithium secondary battery including a cathode, the anode, a separator disposed between the cathode and the anode, and an electrolyte having a lithium salt dissolved therein.

Advantageous Effects

According to the present invention, a crystal orientation ratio of an anode may be adjusted by coating a surface of spherical natural graphite with amorphous carbon, and thus, initial efficiency, electrode adhesion, and capacity characteristics of a lithium secondary battery may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
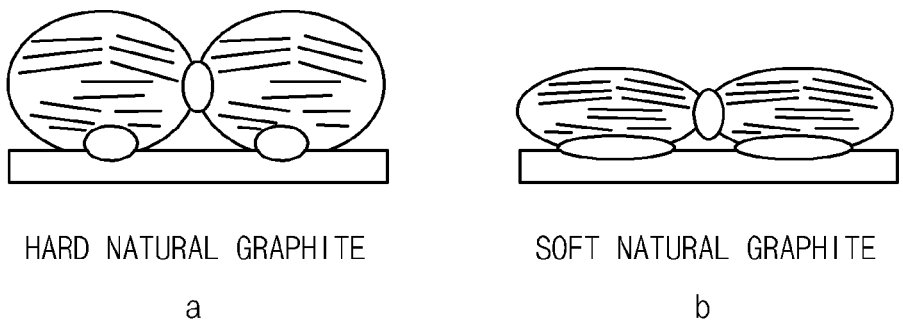
FIG. 1 is a schematic view illustrating hardness according to surfaces of spherical natural graphites, in which (a) spherical hard natural graphite and (b) spherical soft natural graphite are illustrated according to the extent of amorphous carbon layers coated on the surfaces thereof.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

An anode according to an embodiment of the present invention includes spherical natural graphite having a surface coated with an amorphous carbon layer, wherein a crystal orientation ratio is in a range of 0.06 to 0.08 at a compressed density of 1.40 g/cc to 1.85 g/cc.

According to an embodiment of the present invention, initial efficiency, electrode adhesion, and capacity characteristics of a lithium secondary battery may be improved by adjusting the crystal orientation ratio of the anode by coating the surface of the spherical natural graphite with amorphous carbon.

In general, amorphous carbon or crystalline carbon is used as an anode material of a lithium-based secondary battery, and among these carbons, crystalline carbon is mainly used due to its high capacity. The crystalline carbon includes natural graphite or artificial graphite.

With respect to artificial graphite, a charge and discharge efficiency is high, but it is expensive. Also, there may be difficulties in terms of processing due to very low dispersibility in a water-based slurry and desired physical properties of the battery may not be obtained due to low capacity.

In contrast, natural graphite is inexpensive and simultaneously, exhibits excellent voltage flatness and high capacity close to theoretical capacity. Thus, effectiveness as an active material may be high. However, since the natural graphite may be formed in the shape of a highly crystalline plate, impregnation of an electrolyte solution may not be facilitated because an active material may be flattened and compressed to high density when the natural graphite is prepared as an electrode plate. Thus, high-rate charge and discharge characteristics may be degraded.

That is, in a case where the electrode plate is prepared only from plate-shaped highly crystalline natural graphite, limitations, such as exfoliation of the active material from a current collector, electrode plate bending, difficulties in controlling the thickness of the electrode plate, low adhesion between the active material and the current collector, and impregnation with the electrolyte solution, may occur.

Therefore, in the present invention, the above-described limitations are addressed by using and spheroidizing natural graphite which may exhibit high capacity.

Also, with respect to the spherical natural graphite, since electrical resistivity in an in-plane direction of a graphite layer plane is about 1000 times electrical resistivity in a plane direction, it may be possible to reduce anisotropy in electrical resistivity of a graphite-containing composition if a crystal orientation direction of the spherical natural graphite can be controlled. Thus, spherical natural graphite may be suitable for various electronic devices in addition to batteries.

However, as illustrated in FIG. 1, hardness of the spherical natural graphite may vary according to the surface thereof, and, with respect to (a) spherical hard natural graphite, the crystal orientation ratio of the anode may decrease after pressing during the preparation of the anode to obtain low electrode density. Thus, energy density per unit volume may decrease. Also, with respect to (b) spherical soft natural graphite, the softer the graphite is, the higher the crystal orientation ratio of the anode after the pressing is. Thus, peel strength of the anode may increase. Surface hardness of the spherical natural graphite may be affected by the extent of surface coating of the spherical natural graphite.

Thus, the anode according to the embodiment of the present invention may use advantages of the spherical natural graphite which may exhibit high capacity, and simultaneously, the surface hardness of spherical natural graphite particles may be adjusted by coating the surface of the spherical natural graphite with amorphous carbon. Accordingly, stable and high electrode density may not only be obtained even during the pressing, but excellent electrode adhesion, high initial efficiency, and high high-temperature storage characteristics may also be obtained by controlling the crystal orientation ratio of the anode.

According to an embodiment of the present invention, a method of preparing spherical natural graphite from plate-shaped high crystalline natural graphite, for example, may be performed in such a manner that plate-shaped graphite particles are introduced into a spheroidization device and spherical natural graphite having a desired particle diameter may then be obtained by adjusting rotor speed and time.

A method of coating the surface of the spherical natural graphite with an amorphous carbon layer, according to an embodiment of the present invention, for example, may include coating with pyrolytic carbon using one or more vapor or liquid carbon sources selected from the group consisting of methane, ethane, ethylene, butane, acetylene, carbon monoxide, propane, polyvinyl alcohol, and propylene; or coating with liquid or solid pitch. For example, the carbon source or pitch with spherical natural graphite is introduced into a sintering furnace, and the coating may be performed by sintering in a temperature range of 300° C. to 1400° C. Also, the pitch may be coal pitch or petroleum pitch.

The crystal orientation ratio of the anode including the spherical natural graphite having a surface coated with an amorphous carbon layer may be in a range of 0.06 to 0.08 at a compressed density of 1.40 g/cc to 1.85 g/cc. In the case that the crystal orientation ratio is less than 0.06, the amorphous carbon layer may be broken while the spherical natural graphite coated with the amorphous carbon layer is pressed during the pressing so that the spherical natural graphite may be exposed from the outside of the amorphous carbon layer, and in this case, the initial efficiency of the lithium secondary battery may be significantly decreased. In the case in which the crystal orientation ratio is greater than 0.08, an excessive extent of the amorphous carbon layer may act as resistance and thus, the high-temperature storage characteristics of the lithium secondary battery may be significantly decreased.

According to an embodiment of the present invention, the crystal orientation ratio of the anode may be depend on a coating amount of the amorphous carbon layer on the surface of the spherical natural graphite and a compressive force applied when an anode current collector is coated with an anode active material and pressed. The coating amount of the amorphous carbon layer on the spherical natural graphite for satisfying the above crystal orientation ratio may be in a range of 0.1% to 28% based on a total amount of the spherical natural graphite. In the case that the coating amount of the amorphous carbon layer is excessively small, the hardness of the spherical natural graphite and anode density may not be increased and the alignment of the anode may decrease. In contrast, in the case in which the coating amount of the amorphous carbon layer is excessively large, it may not be desirable because the amorphous carbon layer may be an obstacle to the mobility of lithium ions.

According to an embodiment of the present invention, a thickness of the amorphous carbon layer may be in a range of 50 nm to 700 nm.

An average particle diameter ($D_{50}$) of the spherical natural graphite, in which the surface thereof is coated with the amorphous carbon layer having the above thickness range, may be in a range of 12 μm to 18 μm. In this case, with respect to the average diameter of the spherical natural graphite coated with the amorphous carbon layer, it may be advantageous to reduce its particle diameter to maximize the disorder of expansion directions for each particle so that expansion of the particles due to the charge of lithium ions may be prevented. However, in the case that the particle diameter of the spherical natural graphite coated with the amorphous carbon layer is less than 12 μm, a large amount of a binder may be required due to the increase in the number of particles per unit volume, and spheroidization degree and spheroidization yield may decrease. In the case in which the maximum particle diameter is greater than 18 μm, the expansion may be increased to decrease binding between the particles and binding between the particle and the current collector as charge and discharge are repeated, and thus, cycle characteristics may be significantly degraded.

In the anode according to the embodiment of the present invention, the crystal orientation ratio denotes that a crystal structure of the spherical natural graphite included in the anode is arranged in a predetermined direction, and the crystal orientation ratio may be measured by X-ray diffraction (XRD). Specifically, after a (110) plane and a (004) plane of the spherical natural graphite included in the anode are measured by XRD, the crystal orientation ratio of the anode according to the embodiment of the present invention is an area ratio ((110)/(004)) obtained by integrating peak strengths of the (110) plane and the (004) plane. For example, XRD measurement conditions are as follows:

target: Cu(Kα-line) graphite monochromator
slit: divergence slit=1 degree, receiving slit=0.1 mm, scattering slit=1 degree
measurement range and step angle/measurement time:
(110)plane: 76.5°<2θ<78.5°, 0.01°/3 seconds
(004)plane: 53.5°<2θ<56.0°, 0.01°/3 seconds, where "2θ" represents a diffraction angle. The above XRD measurements are only an example, and other measurement methods may also be used. The crystal orientation ratio of the anode may be measured by using the above-described method.

Also, spherical natural graphite having a surface coated with an amorphous carbon layer according to an embodiment of the present invention may have a specific surface area (BET) of 1.5 $m^2/g$ to 4.0 $m^2/g$.

The anode according to the embodiment of the present invention may be prepared by a typical method known in the art. For example, a binder and a conductive agent, if necessary, as well as a solvent are mixed with the spherical natural graphite anode active material and stirred to prepare a slurry, and a metal current collector is then coated with the slurry and pressed. Thereafter, an anode may be prepared by drying the metal current collector.

According to an embodiment of the present invention, the binder is used for maintaining a molded article by binding anode active material particles, wherein a binder, such as polytetrafluoroethylene (PTFE), polyvinylidene fluoride (PVdF), or a styrene-butadiene rubber (SBR), may be used. The binder may be categorized as a solvent-based binder (i.e., binder using an organic solvent as a solvent) represented as PVdF and a water-based binder (i.e., binder using water as a solvent) which is any one selected from the group consisting of an acrylonitrile-butadiene rubber, an SBR, and an acrylic rubber, or a mixture of two or more thereof. Since the water-based binder, different from the solvent-based binder, may be economical and environmentally friendly, may not be harmful to the health of workers, and may have binding effect larger than that of the solvent-based binder, a ratio of the active material for the same volume may be increased. Thus, the capacity of the lithium secondary battery may be increased. An SBR may be used as the water-based binder.

According to an embodiment of the present invention, a thickener may be further included in the anode of the lithium secondary battery for viscosity control. The thickener may be a cellulose-based compound. For example, the thickener may be any one selected from the group consisting of carboxymethyl cellulose (CMC), hydroxy methyl cellulose, hydroxy ethyl cellulose, and hydroxy propyl cellulose, or a mixture of two or more thereof. According to an embodiment of the present invention, the thickener, for example, may be CMC. The spherical natural graphite and the binder may be used in the anode by being dispersed with methyl cellulose in water.

According to an embodiment of the present invention, the conductive agent may be any one selected from the group consisting of natural graphite, artificial graphite, carbon black, acetylene black, Ketjen black, channel black, furnace black, lamp black, thermal black, carbon nanotubes, fullerene, carbon fibers, metal fibers, fluorocarbon, aluminum, nickel powder, zinc oxide, potassium titanate, titanium oxide, and a polyphenylene derivative, or a mixture of two or more thereof. The conductive agent may be carbon black.

Non-limiting examples of an anode current collector according to an embodiment of the present invention may include copper, gold, nickel, or a copper alloy, or a foil prepared by a combination thereof.

Also, the present invention provides a lithium secondary battery including a cathode, an anode, a separator disposed between the cathode and the anode, and an electrolyte having a lithium salt dissolved therein by using the above-described anode.

The lithium secondary battery according to an embodiment of the present invention may include all types of typical lithium secondary batteries, such as a lithium metal secondary battery, a lithium-ion secondary battery, a lithium polymer secondary battery, or a lithium-ion polymer secondary battery.

The lithium secondary battery of the present invention may be prepared according to a typical method known in the art. For example, the lithium secondary battery may be prepared by inserting a porous separator between the cathode and the anode, and introducing an electrolyte having a lithium salt dissolved therein.

A cathode according to an embodiment of the present invention may be prepared according to a typical method known in the art. For example, a binder, a conductive agent, and a dispersant, if necessary, as well as a solvent are mixed with a cathode active material and stirred to prepare a slurry, and a metal current collector is then coated with the slurry and pressed. Thereafter, the cathode may be prepared by drying the metal current collector.

A cathode current collector is coated with a cathode active material and the cathode may then be prepared by drying the coated cathode current collector. In this case, lithium-containing transition metal oxide may be used as the cathode active material. For example, any one selected from the group consisting of $Li_xCoO_2$(0.5<x<1.3), $Li_xNiO_2$ (0.5<x<1.3), $Li_xMnO_2$(0.5<x<1.3), $Li_xMn_2O_4$(0.5<x<1.3), $Li_x(Ni_aCo_bMn_c)O_2$(0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$(0.5<x<1.3, 0<a<2, 0<b<2, 0<c<2, a+b+c=2), $Li_xMn_{2-z}Ni_zO_4$(0.5<x<1.3, 0<z<2), $Li_xMn_{2-z}Co_zO_4$ (0.5<x<1.3, 0<z<2), $Li_xCoPO_4$(0.5<x<1.3), and $Li_xFePO_4$ (0.5<x<1.3), or a mixture of two or more thereof may be used. The lithium-containing transition metal oxide may be coated with a metal, such as aluminum (Al), or a metal oxide. Also, sulfide, selenide, and halide may be used in addition to the lithium-containing transition metal oxide.

Any metal having high conductivity and no reactivity in a voltage range of the battery may be used as the metal current collector, in which the slurry of the electrode active material may be easily adhered thereto. Non-limiting examples of the cathode current collector may include aluminum, nickel, or a foil prepared by a combination thereof.

An organic solvent, such as N-methylpyrrolidone (NMP), dimethylformamide (DMF), acetone, and dimethylacetamide, or water, may be used as the solvent used for forming the cathode. These solvents may be used alone or in a mixture of two or more. An amount of the solvent used may be sufficient if the solvent may dissolve and disperse the electrode active material, the binder, and the conductive agent in consideration of a coating thickness of the slurry and manufacturing yield.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used. However, the separator is not limited thereto.

A lithium salt, which may be included as an electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_3)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

The electrolyte used in the present invention may include an organic liquid electrolyte, an inorganic liquid electrolyte, a solid polymer electrolyte, a gel-type polymer electrolyte, a solid inorganic electrolyte, and a molten inorganic electrolyte. However, the present invention is not limited thereto.

A shape of the lithium secondary battery of the present invention is not particularly limited, and for example, a cylindrical type using a can, a prismatic type, a pouch type, or a coin type may be used.

The lithium secondary battery of the present invention may be used as power sources of various electronic products. For example, the lithium secondary battery of the present invention may be used in mobile phones, handphones, game consoles, portable televisions, notebook computers, and calculators. However, the present invention is not limited thereto.

Hereinafter, the present invention will be more fully described according to specific embodiments. The present invention may, however, be embodied in many different forms and should not be construed as being limited to the embodiments set forth herein. Rather, these embodiments are provided so that this disclosure will be thorough and complete, and will fully convey the scope of the present invention to those skilled in the art.

EXAMPLES

Hereinafter, the present invention will be described in more detail, according to examples and experimental examples. However, the present invention is not limited thereto.

Example 1

Preparation of Spherical Natural Graphite Having Surface Coated with Amorphous Carbon Petroleum pitch and spherical natural graphite were mixed at a weight ratio of 10:100 and sintered at a temperature of about 1000° C. by being put in a sintering furnace to prepare spherical natural graphite (12 μm) in which an extent of an amorphous carbon layer was about 2% of a total amount of the spherical natural graphite coated with the amorphous carbon layer.

Anode Preparation

Spherical natural graphite having a surface coated with amorphous carbon prepared as an anode active material, acetylene black as a conductive agent, a styrene-butadiene rubber (SBR) as a binder, and carboxymethyl cellulose (CMC) as a thickener were mixed at a weight ratio of 96:1:2:1, and water ($H_2O$) as a solvent was then mixed therewith to prepare a homogeneous anode active material slurry.

One surface of a copper current collector was coated with the prepared anode active material slurry to a thickness of 65 μm, and then dried and pressed. Then, an anode was prepared by punching into a predetermined size. In this case, a crystal orientation ratio of the anode at a compressed density of 1.6 g/cc was 0.061.

Lithium Secondary Battery Preparation $LiCoO_2$ was used as a cathode active material. The cathode active material, acetylene black as a conductive agent, and an SBR as a binder were mixed at a weight ratio of 94:3.5:2.5, and the mixture was then added to NMP to prepare a cathode active material slurry. One surface of an aluminum foil was coated with the prepared slurry, and then dried and pressed. Then, a cathode was prepared by punching into a predetermined size.

A polyolefin separator was disposed between the cathode and the anode. Then, an electrolyte, in which 1M $LiPF_6$ was dissolved in a solvent having ethylene carbonate (EC) and diethyl carbonate (DEC) mixed at a volume ratio of 30:70, was injected thereinto to prepare a coin-type lithium secondary battery.

Example 2

A lithium secondary battery was prepared in the same manner as in Example 1 except that spherical natural graphite (13 μm), in which an extent of an amorphous carbon layer was about 2.3% of a total amount of the spherical natural graphite coated with the amorphous carbon layer, was prepared by mixing petroleum pitch and spherical natural graphite at a weight ratio of 15:100, and an anode having a crystal orientation ratio of 0.063 at a compressed density of 1.6 g/cc was used.

Example 3

A lithium secondary battery was prepared in the same manner as in Example 1 except that spherical natural graphite (16 μm), in which an extent of an amorphous carbon layer was about 4.1% of a total amount of the spherical natural graphite coated with the amorphous carbon layer, was prepared by mixing petroleum pitch and spherical natural graphite at a weight ratio of 25:100, and an anode having a crystal orientation ratio of 0.078 at a compressed density of 1.6 g/cc was used.

Example 4

A lithium secondary battery was prepared in the same manner as in Example 1 except that spherical natural graphite (15 μm), in which an extent of an amorphous carbon layer was about 3.4% of a total amount of the spherical natural graphite coated with the amorphous carbon layer, was prepared by mixing petroleum pitch and spherical natural graphite at a weight ratio of 20:100, and an anode having a crystal orientation ratio of 0.07 at a compressed density of 1.6 g/cc was used.

Comparative Example 1

A lithium secondary battery was prepared in the same manner as in Example 1 except that spherical natural graphite (20 μm) coated with amorphous carbon was prepared by mixing petroleum pitch and spherical natural graphite at a weight ratio of 30:100, and an anode having a crystal orientation ratio of 0.092 at a compressed density of 1.6 g/cc was used.

Comparative Example 2

A lithium secondary battery was prepared in the same manner as in Example 1 except that spherical natural graphite (19 μm) coated with amorphous carbon was prepared by mixing petroleum pitch and spherical natural graphite at a weight ratio of 50:100, and an anode having a crystal orientation ratio of 0.118 at a compressed density of 1.6 g/cc was used.

Comparative Example 3

A lithium secondary battery was prepared in the same manner as in Example 1 except that spherical natural graphite (8 μm) coated with amorphous carbon was prepared by mixing petroleum pitch and spherical natural graphite at a weight ratio of 5:100, and an anode having a crystal orientation ratio of 0.034 at a compressed density of 1.6 g/cc was used.

Comparative Example 4

A lithium secondary battery was prepared in the same manner as in Example 1 except that spherical natural graphite (9 μm) coated with amorphous carbon was prepared by mixing petroleum pitch and spherical natural graphite at a weight ratio of 7.5:100, and an anode having a crystal orientation ratio of 0.036 at a compressed density of 1.6 g/cc was used.

Comparative Example 5

A lithium secondary battery was prepared in the same manner as in Example 1 except that spherical natural graphite (10 μm) coated with amorphous carbon was prepared by mixing petroleum pitch and spherical natural graphite at a weight ratio of 1:100, and an anode having a crystal orientation ratio of 0.055 at a compressed density of 1.6 g/cc was used.

Experimental Example 1: Crystal Orientation Ratio Measurement

XRD measurements using Cu-Kα radiation were performed on the anodes prepared according to Examples 1 to 4 and Comparative Examples 1 to 5. After a (110) plane and a (004) plane of the spherical natural graphite included in each anode were measured by XRD, a crystal orientation ratio was calculated from an area ratio ((110)/(004)) obtained by integrating peak strengths of the (110) plane and the (004) plane. For example, XRD measurement conditions are as follows:
  target: Cu(Kα-line) graphite monochromator
  slit: divergence slit=1 degree, receiving slit=0.1 mm, scattering slit=1 degree
  measurement range and step angle/measurement time:
    (110)plane: $76.5°<2\theta<78.5°$, 0.01°/3 seconds
    (004)plane: $53.5°<2\theta<56.0°$, 0.01°/3 seconds, where "$2\theta$" represents a diffraction angle.

Experimental Example 2: Measurement of Initial Efficiency of Lithium Secondary Battery In order to investigate initial efficiencies of the coin-type lithium secondary batteries prepared in Examples 1 to 3 and Comparative Examples 1 and 2, the coin-type lithium secondary batteries prepared in Examples 1 to 3 and Comparative Examples 1 and 2 were charged at a constant current (0.1 C) to a voltage of 5 mV. Then, the charging was stopped until the current reached 0.005 C at 5 mV, and then terminated. The batteries were discharged at a constant current (0.1 C) to a voltage of 1.0 V, and initial efficiencies according to a crystal orientation ratio were measured. The results thereof are presented in FIG. 2.

Figure 2:
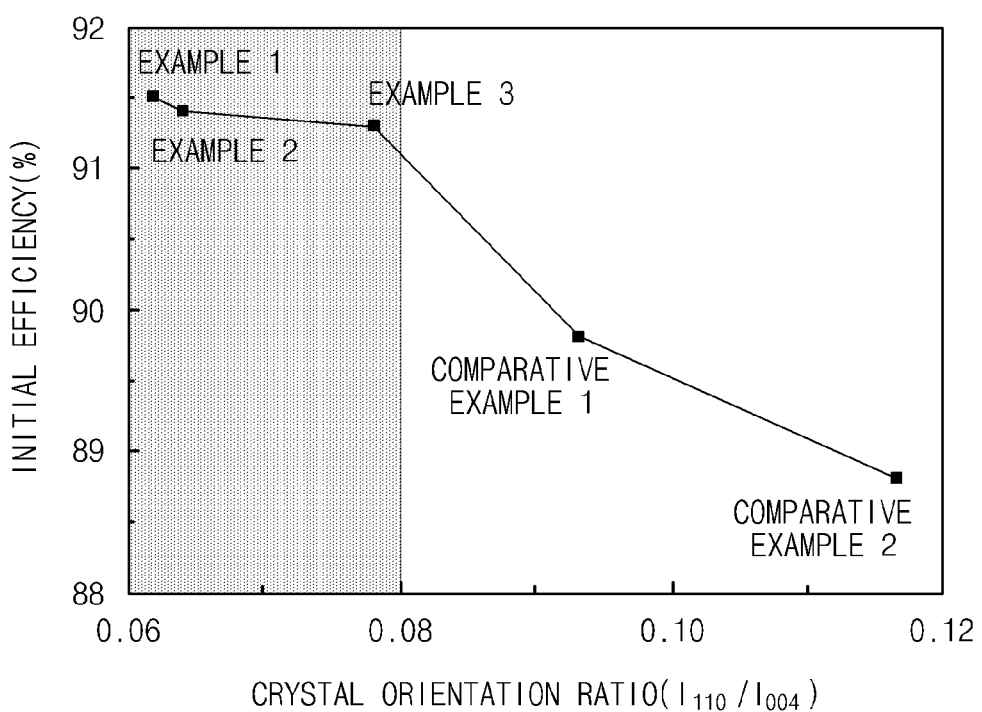
FIG. 2 is a graph illustrating initial efficiency characteristics of lithium secondary batteries of Examples 1 to 3 and Comparative Examples 1 and 2 according to a crystal orientation ratio, according to Experimental Example 2 of the present invention.

As illustrated in FIG. 2, with respect to Examples 1 to 3 in which the crystal orientation ratio of the anode was in a range of 0.06 to 0.08, initial efficiencies were about 91% or more. In contrast, with respect to Comparative Examples 1 and 2 in which the crystal orientation ratio of the anode was greater than 0.08, initial efficiencies were about 90% or less.

Thus, it may be understood that the initial efficiency of the lithium secondary battery may be improved by adjusting the crystal orientation ratio of the anode. In particular, it may be confirmed that significantly superior initial efficiencies were obtained when the crystal orientation ratio of the anode was in a range of 0.06 to 0.08.

Experimental Example 3: Measurement of Capacity Characteristics of Lithium Secondary Battery In order to investigate capacity characteristics of the coin-type lithium secondary batteries prepared in Examples 1, 3 and 4 and Comparative Examples 3 to 5, the coin-type lithium secondary batteries prepared in Examples 1, 3 and 4 and Comparative Examples 3 to 5 were charged at 1 C to 5 mV/0.005 C at 45° C. under a constant current/constant voltage (CC/CV) condition and then discharged at a constant current (CC) of 1 C to a voltage of 1.0 V to measure capacities. The charge and discharge were repeated 1 to 3 cycles, and capacity characteristics according to a crystal orientation ratio after 4 weeks are presented in FIG. 3.

Figure 3:
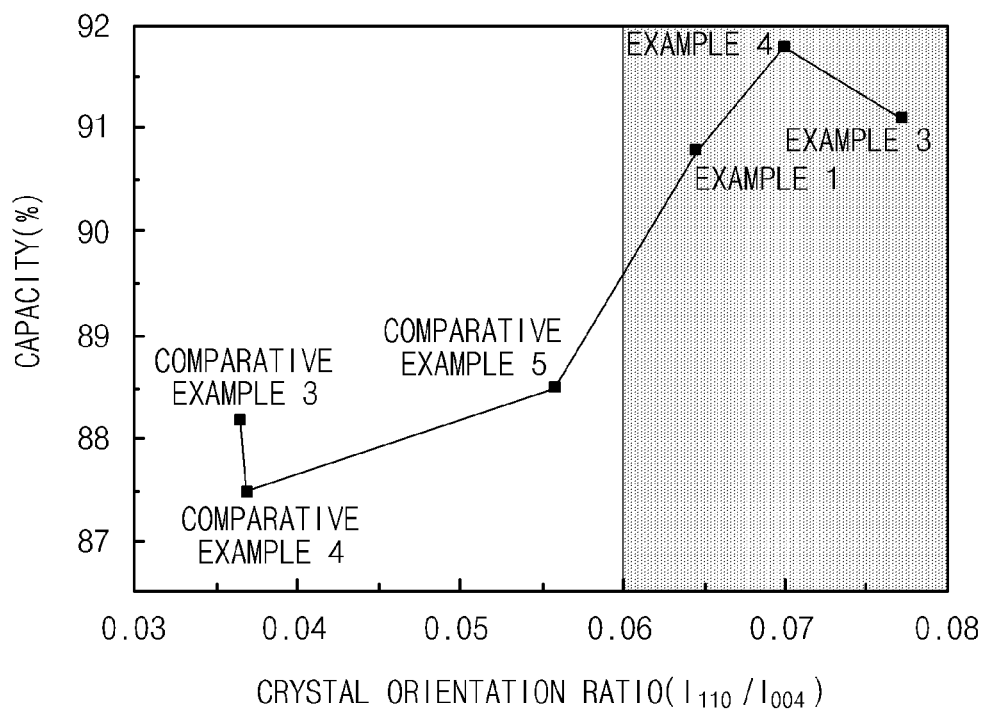
FIG. 3 is a graph illustrating capacity characteristics of lithium secondary batteries of Examples 1, 3, and 4, and Comparative Examples 3 to 5 according to a crystal orientation ratio, according to Experimental Example 3 of the present invention.

As illustrated in FIG. 3, with respect to Examples 1, 3 and 4 in which the crystal orientation ratio of the anode was in a range of 0.06 to 0.08, capacities of the lithium secondary batteries were about 90% or more. In contrast, with respect to Comparative Examples 3 to 5 in which the crystal orientation ratio of the anode was less than 0.06, capacities of the lithium secondary batteries were about 88% or less.

Thus, it may be confirmed that the capacity of the lithium secondary battery may be improved by adjusting the crystal orientation ratio of the anode. In particular, it may be understood that significantly superior capacity characteristics were obtained when the crystal orientation ratio of the anode was in a range of 0.06 to 0.08.

INDUSTRIAL APPLICABILITY

According to the present invention, since initial efficiency, electrode adhesion, and capacity characteristics of a lithium secondary battery may be improved by adjusting a crystal orientation ratio of an anode by coating a surface of spherical natural graphite with amorphous carbon, it may be suitable for secondary batteries.

The invention claimed is:

1. An anode comprising spherical natural graphite having a surface coated with an amorphous carbon layer, wherein the amorphous carbon layer is included in an amount of from 2% to 4.1% based on the total weight of the spherical natural graphite; and
   wherein a crystal orientation ratio is in a range of 0.061 to 0.078 at a compressed density of 1.40 g/cc to 1.85 g/cc.

2. The anode of claim 1, wherein the crystal orientation ratio is an area ratio ((110)/(004)) obtained by measuring a (110) plane and a (004) plane of the spherical natural graphite included in the anode by X-ray diffraction (XRD) and integrating each measured XRD peak.

3. The anode of claim 1, wherein a specific surface area (BET) of the spherical natural graphite having a surface coated with an amorphous carbon layer is in a range of 1.5 $m^2/g$ to 4.0 $m^2/g$.

4. The anode of claim 1, wherein the amorphous carbon layer is formed by coating with pyrolytic carbon using one or more vapor or liquid carbon sources selected from the group consisting of methane, ethane, ethylene, butane, acetylene, carbon monoxide, propane, polyvinyl alcohol, and propylene; or coating with liquid or solid pitch.

5. The anode of claim 4, wherein the pitch is coal pitch or petroleum pitch.

6. The anode of claim 1, wherein a thickness of the amorphous carbon layer is in a range of 50 nm to 700 nm.

7. The anode of claim 1, further comprising a water-based binder.

8. The anode of claim 7, wherein the water-based binder is any one selected from the group consisting of an acrylonitrile-butadiene rubber, a styrene-butadiene rubber (SBR), and an acrylic rubber, or a mixture of two or more thereof.

9. The anode of claim 1, further comprising a thickener.

10. The anode of claim 9, wherein the thickener is a cellulose-based compound.

11. The anode of claim 10, wherein the cellulose-based compound is any one selected from the group consisting of carboxymethyl cellulose, hydroxy methyl cellulose, hydroxy ethyl cellulose, and hydroxy propyl cellulose, or a mixture of two or more thereof.

12. A lithium secondary battery comprising:
    a cathode;
    an anode;
    a separator disposed between the cathode and the anode; and
    an electrolyte having a lithium salt dissolved therein,
    wherein the anode is the anode of claim 1.

13. The anode of claim 1, wherein the average particle diameter ($D_{50}$) of the spherical natural graphite having a surface coated with an amorphous carbon layer is in a range of 12 μm to 18 μm.

* * * * *